A. L. FRY & F. C. NAGEL.
PNEUMATIC TIRE.
APPLICATION FILED JUNE 23, 1915.
1,287,951.
Patented Dec. 17, 1918.
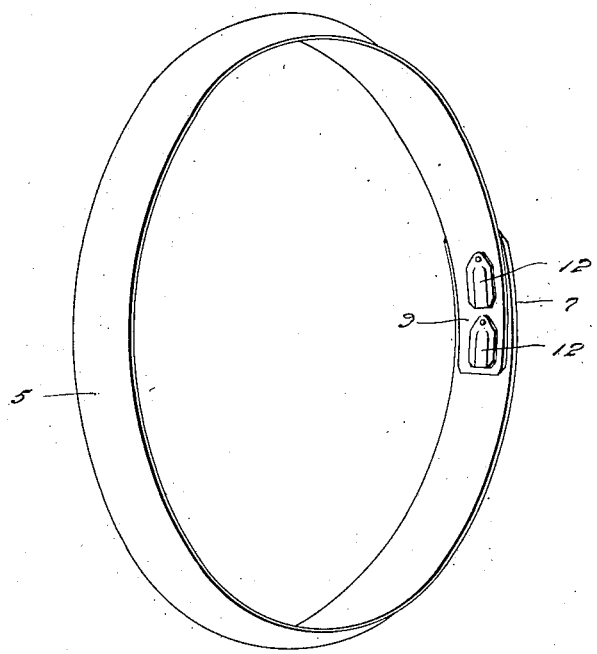
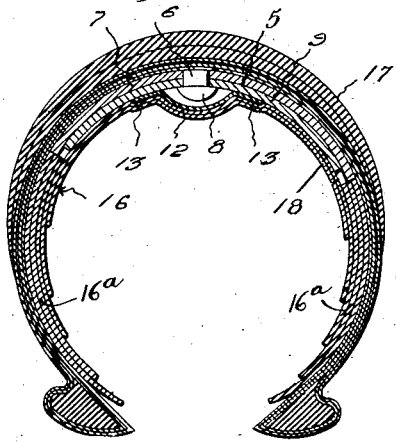
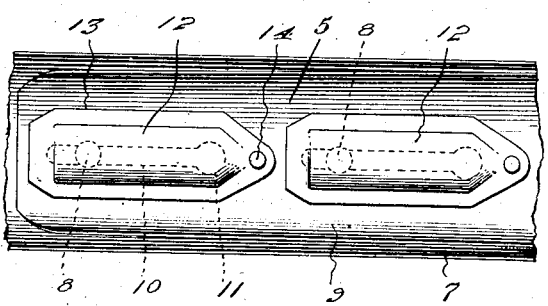
Inventor
A. L. Fry
F. C. Nagel.

UNITED STATES PATENT OFFICE.

ALVA L. FRY AND FERDINAND C. NAGEL, OF SEWARD, NEBRASKA.

PNEUMATIC TIRE.

1,287,951.  Specification of Letters Patent.  Patented Dec. 17, 1918.

Application filed June 23, 1915. Serial No. 35,887.

*To all whom it may concern:*

Be it known that we, ALVA L. FRY and FERDINAND C. NAGEL, citizens of the United States, residing at Seward, in the county of Seward and State of Nebraska, have invented certain new and useful Improvements in Pneumatic Tires; and we do hereby declare the following to be a full, clear, and exact description of the invention, such as will enable others skilled in the art to which it appertains to make and use the same.

This invention relates to pneumatic tires, and more particularly to an internal armor especially designed for use in connection with pneumatic tires for protecting the inner tube and preventing rim cutting of the casing due to striking or running over sharp objects upon the road.

The invention has for its primary object to provide an improved armor for pneumatic tires including essentially a band constructed of spring sheet metal having the free ends detachably connected, and means for protecting the inner tube of the tire against injury thereto by the connecting or fastening means for the ends of the armor band.

Another object is the provision of a fabric liner adapted to be arranged in the tire and against the annular armor element to insure against contact of the inner tube with the metallic surface of the armor band.

With these and other objects in view, the invention consists in the novel construction, arrangement and formation of parts as will be hereinafter specifically described, claimed and illustrated in the accompanying drawing, in which:

Figure 1 represents a perspective view of the improved tire armor removed.

Fig. 2 represents a transverse sectional view through a pneumatic tire casing illustrating the improved tire armor applied to use and, Fig. 3 represents a fragmental interior plan view of the adjacent overlapped ends of the band constituting the tire armor.

Referring to the drawing in detail, wherein similar reference numerals designate corresponding parts throughout the several views, the numeral 5 indicates a strip of sheet steel or similar resilient metal, which is curved transversely to conform with the inner surface of the tread portion of a tire casing, as clearly illustrated in Fig. 2. A pair of rivets 6 are secured to one end 7 of the strip 5 and are formed at their inner extremities with heads 8 spaced a distance from the end 7 approximately equal to the thickness of the other end 9 of the strip. The end 9 is formed with a pair of spaced elongated slots or openings 10 having one end enlarged, as indicated at 11, to receive the heads 8 of the rivets, the relatively narrow portions of the openings 10 being of approximately the same width as the diameters of the shanks 6.

Guard plates 12 of elongated concavo convex formation are provided with lateral flanges 13 secured to the end 9 of the strip or band 5 by rivets 14 or equivalent means for protecting the inner tube against contact with the heads 8 of the rivets.

A lining 16 is arranged inwardly from the band 5 and extends a distance beyond the longitudinal edges thereof and engages with the side walls of the tire casing 17, as clearly illustrated in Fig. 1. The lining is constructed of a plurality of side strips 16ᵃ of fabric arranged against the inner surfaces of the opposite side walls of the tire and abutting the edges of the band 5. The side strips 16ᵃ are secured to and are connected by a center strip 18 consisting of one or more layers of fabric which entirely covers the inner surface of the band 5 and coacts with the side strips to present a substantially smooth surface for contact with the inner tube (not shown).

In use, the diameter of the band 5 is reduced by sliding the overlapped ends 7 and 9 thereof longitudinally, the shanks 6 of the rivets sliding within the slots 10. While contracted the band is inserted in the tire casing 7 and, when released, automatically springs out expanding the tire casing and assisting to retain it in operative position. The lining 16 is subsequently inserted in the casing and engaged with the armor band 5, as clearly illustrated in Fig. 2 and the inner tube is positioned within the casing in the usual manner and inflated, subsequently to fastening the tire casing upon the rim.

What we claim is:

1. In combination, a tire casing, an armor band arranged in said casing, and a lining arranged in the tire casing against the side walls of the latter and the inner surface of said band, the lining including side strips arranged against the inner surface of the side walls of the tire casing and abutting the longitudinal edges of said band, and a center strip secured to and connecting the side strips and arranged against the inner surface of said band.

2. A tire armor including a band formed of spring sheet metal having the free ends overlapped, the inner end of the band having longitudinally extending slots formed therein, headed rivets secured to the outer of the overlapped ends and slidably mounted in the slots, and a housing secured to the inner end of the band and positioned over the slots to incase the rivets to prevent the same from coming in contact with the inner tube of the tire, and a lining engaged with the inner surface of said band.

In testimony whereof we have affixed our signatures in presence of two witnesses.

ALVA L. FRY.
FERDINAND C. NAGEL.

Witnesses:
AUGUST F. RUMP,
RICHARD SMITKEIN.